(12) United States Patent
Luscombe et al.

(10) Patent No.: US 6,731,389 B2
(45) Date of Patent: May 4, 2004

(54) METHOD AND APPARATUS FOR THE ELIMINATION OF POLARIZATION FADING IN INTERFEROMETRIC SENSING SYSTEMS

(75) Inventors: John Luscombe, Oxford (GB); John Maida, Houston, TX (US)

(73) Assignee: Sercel, Inc., Houston, TX (US)

( * ) Notice: Subject to any disclaimer, the term of this patent is extended or adjusted under 35 U.S.C. 154(b) by 27 days.

(21) Appl. No.: 10/141,372

(22) Filed: May 8, 2002

(65) Prior Publication Data

US 2003/0210403 A1 Nov. 13, 2003

(51) Int. Cl.[7] ................................................ G01B 9/02
(52) U.S. Cl. ........................................ 356/491; 356/73.1
(58) Field of Search ................................ 356/491, 477, 356/73.1, 492, 493, 494, 495; 250/227.19, 227.27

(56) References Cited

U.S. PATENT DOCUMENTS

| | | | |
|---|---|---|---|
| 4,059,759 A | * | 11/1977 | Harney et al. ............... 356/491 |
| 4,080,073 A | * | 3/1978 | Wolga ......................... 356/301 |
| 4,653,915 A | | 3/1987 | Frigo et al. |
| 4,897,543 A | | 1/1990 | Kersey |
| 4,932,783 A | | 6/1990 | Kersey et al. |
| 5,104,222 A | | 4/1992 | Kersey et al. |
| 5,173,743 A | | 12/1992 | Kim |
| 6,195,162 B1 | | 2/2001 | Varnham et al. |
| 2001/0030281 A1 | | 10/2001 | Schulz et al. |

* cited by examiner

Primary Examiner—Samuel A. Turner
(74) Attorney, Agent, or Firm—Law Office of Tim Cook P.C.

(57) ABSTRACT

In an interferometric sensing apparatus, a scrambler is positioned in front of a polarizer, followed by a detector. In that way, although the two beams remain orthogonal to each other, they are continuously rotated, relative to the polarizer. In some positions, both beams pass through the polarizer and interfere, thus eliminating polarization fading. The signal is amplitude modulated at the rotation frequency of the scrambler, but this modulation is removed by low pass filtering.

8 Claims, 1 Drawing Sheet

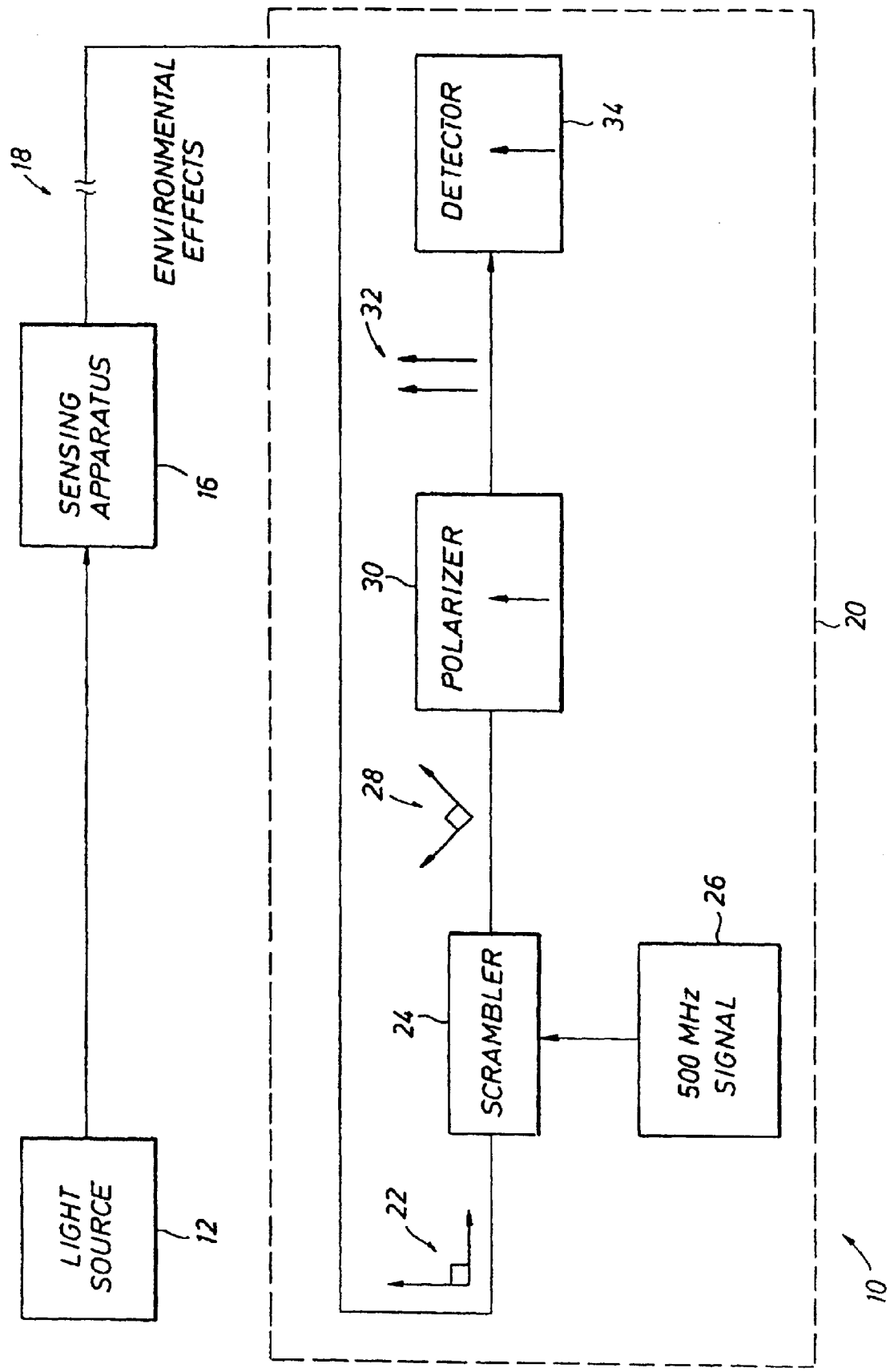

METHOD AND APPARATUS FOR THE ELIMINATION OF POLARIZATION FADING IN INTERFEROMETRIC SENSING SYSTEMS

FIELD OF THE INVENTION

The present invention relates generally to the field of interferometric sensing apparatus and, more particularly, to apparatus for preventing or reducing polarization fading in sensing interferometers.

BACKGROUND OF THE INVENTION

The present invention is particularly adapted for use in a seismic array which includes fiber optic interferometric sensing apparatus. Typically such sensing apparatus uses one of a number of typical means for varying the optical path length in an optical fiber which is used as the sensing means to detect acoustic signals well known in seismic exploration techniques.

In the seismic exploration art, there is a continuing need to improve the rate of successfully locating recoverable reserves of hydrocarbons. Advancements in seismic sensing equipment have a direct impact on the rate of such success. Known seismic sensing equipment includes large arrays of optical hydrophones, typically using interferometric sensing techniques.

However, such systems are prone to polarization fading. Polarization fading is due primarily to changes in the mechanical configuration of the sensing fibers, which changes result primarily from the effects of strain, temperature, and other effects. These changes cause random changes in the plane of polarization of the propagating beams, thus causing polarization fading.

Thus, polarization fading is a known phenomenon in such interferometric sensing systems. In these systems, a light beam is split by a beam splitter into two beams, and then recombined after the two beams have followed different paths. In the following explanation of polarization fading, assume that the z axis represents the direction of propagation of the light, and that the x and y axes lie in the plane orthogonal to the direction of propagation.

A monochromatic beam is incident on the beam splitter. The electric vector of the incident beam is given by $$E_x = 2 \cos \omega t \quad E_y = 0$$

The electric vectors of the emerging beams are given by $$E_x = \cos(\omega t + \theta) \quad E_y = 0$$

$$E_x = \cos(\omega t + \phi) \quad E_y = 0$$

where $\theta$, $\phi$ are the path lengths of the two arms of the interferometer, expressed in radians. The two beams interfere when recombined and the light intensity is given by the time average of $$I = (\Sigma E_x)^2 + (\Sigma E_y)^2$$

For this case, $$<I> = 1 + \cos(\theta - \phi)$$

If the plane of polarization of the second beam is rotated through 90° with respect to the first beam as it traverses the second arm, then $$E_x = 0 \quad E_y = \cos(\omega t + \phi)$$

and $$<I> = 1$$

Thus, the term $\cos(\theta - \phi)$ is suppressed, resulting in polarization fading.

More particularly, any non-circularity in the optical fiber, or any stress or torsion applied to the fiber, induces birefringence. A single mode optical fiber then supports two modes which propagate with different phase velocities. The polarization state therefore evolves along the optical fiber. The birefringence can be linear (induced by stress or non-circularity) or circular (induced by torsion), or a combination of linear and circular. Changes in temperature or the physical disposition of the fiber will affect the linear and circular birefringence differently, thus causing the state of polarization at the output of the optical fiber to fluctuate.

Polarization fading is a phenomenon that occurs with linearly polarized beams whose planes of polarization are orthogonal. Circularly polarized beams do not exhibit polarization fading because a polarizer will always transmit a circularly polarized beams as a linearly polarized beam with a plane of polarization determined by the orientation of the polarizer and with an intensity of 50%. Consequently, any two circularly polarized beams passing through a polarizer emerge with the same plane of polarization and can interfere. For this reason, it is only necessary to consider states of polarization that lie on the equator of the Poincare sphere.

These effects are important in an optical fiber interferometric sensor because the light from one arm of an interferometer will not interfere with light from another arm of the interferometer if the two states of polarization are orthogonal. This condition is generally known as polarization fading, i.e. the visibility of the interference fringes fades to zero as the states of polarization of the two polarized modes become orthogonal.

A number of systems have been proposed to reduce or eliminate polarization fading. One such system is shown in U.S. Pat. No. 5,173,743 to Kim. In the system of Kim, an extended interferometer having a plurality of sensors and a compensating interferometer are used. They are driven from a pulsed optical signal source wherein the optical signal comprises sequences of two pulses each. To prevent polarization fading, the polarization of a predetermined one of each two-pulse sequence is switched, preferably orthogonally, from sequence to sequence. Interference pulse output groups are produced for each two-pulse driving sequence. Each output group has the same number of usable pulses as the number of sensors in the interferometer. In Kim, the return optical signal is first applied to the sensor which converts the optical signal into an electrical signal. Then, a switch is connected to receive the electrical signals from the sensor. A timer delivers a timing signal to the switch to cause incoming pulses to be distributed alternately to another set of switches. The timer sends timing signals to this set of switches to cause them to switch consecutively from one output to the next. Such a system significantly adds to the cost and complexity of the sensor array.

Another known system is referred to as the Litton tri-cell. The Litton tri-cell takes advantage of the fact that if two beams are incident on a polarizer whose plane of polarization is not at right angles to either of the beams, then the beams emerge from the polarizer with attenuated amplitudes but with the same plane of polarization, so interference can take place. However, the Litton tri-cell requires a minimum of three polarizers and three detectors to ensure that at least one of the polarizers is not at right angles to either beam.

Another known system is referred to as a polarization-maintaining fiber system. That system uses fiber that maintains the state of polarization (SOP) along the fiber, and thus does not have a problem with orthogonal beams. However, the use of such fiber is uneconomical, and also requires polarization-maintaining connectors and splices, which are impractical.

Thus, there remains a need for a system having an array of interferometric sensors which is simple, practical, economic, and effective in eliminating polarization fading. The present invention is directed to such a system.

SUMMARY OF THE INVENTION

As previously described, polarization fading occurs when the two light beams arriving at a detector are at right angles to one another. If the beams are orthogonal, they do not create an interference pattern, and the signal of interest is lost.

The present invention provides a scrambler in front of a polarizer, followed by the detector. In that way, although the two beams remain orthogonal to each other, they are continuously rotated, relative to the polarizer. In some positions, both beams pass through the polarizer and interfere, thus eliminating polarization fading. The signal is amplitude modulated at the rotation frequency of the scrambler, but this modulation is removed by low pass filtering.

The system ensures equal excitation of all states of linear polarization and thus gives 50% visibility of the interference signal at all times. As used herein, the term "scrambler" refers to a device that takes an arbitrary input state of polarization and rotates it continuously about the equatorial axis of the Poincare sphere. A scrambler is typically a device that employs the electro-optic effect in a lithium niobate crystal. The input beam is split into two orthogonal linear polarizations, corresponding to the two propagation modes in the crystal (the TE and TM modes of a dielectric wave guide).

The application of a voltage gives rise to two effects. The first of these effects is retardation. The phase difference between the two modes, at the output, is linearly proportional to the applied field. This allows the SOP to be changed between linear and circular polarization.

The second effect is mode conversion. In the presence of an electric field some of the energy in the TM mode is converted to the TE mode. This allows the plane of polarization to be rotated through an angle, proportional to the applied field. The effect also depends on the relative phase of the two modes.

The effect can be combined in integrated optic devices to produce scramblers and controllers of the type just described. Thus, the present invention provides a practical solution to polarization fading, and is adaptable to many applications, such as for example multiplexed arrays.

BRIEF DESCRIPTION OF THE DRAWING

These and other features of the invention will be apparent to those of skill in the art from a review of the following detailed description along with the accompanying drawing FIGURE, which is a block diagram of the system to reduce polarization fading which is the focus of this invention.

DETAILED DESCRIPTION OF A PREFERRED EMBODIMENT

The sole drawing FIGURE illustrates a system 10 in which the present invention finds application to eliminate or reduce polarization fading in an interferometric sensing apparatus. While the system is illustrated in its basic form, other arrangements for the sensing apparatus and other components may as well be used within the scope and spirit of this invention.

The overall system 10 includes a light source 12, preferably a monochromatic laser light source which directs light into a sensing apparatus 16 to detect a parameter such as, for example, a seismic signal detected by a hydrophone or a geophone. Non-orthogonal light beams, capable of being sensed, is provided by the sensing apparatus 16 but due to environmental effects 18 the polarization of the light fades. It is at this point in the system 10 where the present invention departs from the art. A subsystem 20 eliminates the polarization fading which has been introduced.

Because of the effects 18, the light beams, as illustrated by the axes 22, are orthogonal or very nearly orthogonal, and thus do not create an interference pattern. A scrambler 24, such as a Thorlabs light stage polarization controller, receives the orthogonal signal and rotates the beams continuously. The scrambler is driven by a signal source, such as a 500 MHz signal source 26. The rotating light beams, shown as axes 28, are then impressed onto a polarizer 30. In some positions in the rotation, both beams pass through the polarizer 30, as shown by beams 32, and interfere, thus eliminating polarization fading. The signal is amplitude modulated by the scrambler and the frequency of the signal source 26, but a detector 34 preferably includes a low pass filter.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:
1. A system to eliminate polarization fading comprising:
  a. a scrambler for receiving a light signal with substantially orthogonal polarization and for rotating the light signal at a selected frequency; and
  b. a polarizer for receiving the rotating light signal from the scrambler and for polarizing the received light signal to develop detectable polarized light from the rotating light signal.
2. The system of claim 1, wherein the detectable polarized light developed by the polarizer is an amplitude modulated signal and further comprising a low pass filter adapted to receive the polarized light and demodulate the polarized light.
3. A method of eliminating polarization fading in an interferometric sensing apparatus, the apparatus having a light source, a sensing apparatus, and a light detector, the method comprising the steps of:
  a. receiving light from the sensing apparatus;
  b. rotating the received light at a selected frequency to develop a rotating beam; and
  c. polarizing the rotating beam to develop a detectable interference signal.
4. The method of claim 3 wherein the selected frequency is 500 MHz.
5. The method of claim 3 further comprising the step of low pass filtering the polarized light.
6. A system for eliminating polarization fading in an interferometric sensing apparatus, the apparatus having a light source and a light sensor, the system comprising:
  a. means for receiving light from the sensor;
  b. means for rotating the received light at a selected frequency to develop a rotating beam; and c. means for polarizing the rotating beam to develop a detectable interference signal.

7. The system of claim 6 wherein the selected frequency is 500 MHz.

8. The system of claim 6 further comprising means for low pass filtering the polarized light.

* * * * *